United States Patent
Urbanek

(10) Patent No.: US 9,420,399 B2
(45) Date of Patent: Aug. 16, 2016

(54) GENERIC MOBILE DEVICES CUSTOMIZATION FRAMEWORK

(71) Applicant: Sprint Communications Company L.P., Overland Park, KS (US)

(72) Inventor: Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/877,215

(22) Filed: Oct. 7, 2015

(65) Prior Publication Data

US 2016/0094931 A1 Mar. 31, 2016

Related U.S. Application Data

(62) Division of application No. 13/622,234, filed on Sep. 18, 2012, now Pat. No. 9,198,027.

(51) Int. Cl.
*H04M 3/00* (2006.01)
*H04W 4/00* (2009.01)
*H04W 8/20* (2009.01)
*H04W 8/18* (2009.01)
*H04W 88/02* (2009.01)

(52) U.S. Cl.
CPC .............. *H04W 4/001* (2013.01); *H04W 8/18* (2013.01); *H04W 8/20* (2013.01); *H04W 88/02* (2013.01)

(58) Field of Classification Search
CPC ........ H04W 8/245; H04W 8/183; H04W 8/18
USPC .................... 455/418, 432.1, 432.3
See application file for complete search history.

(56) References Cited

U.S. PATENT DOCUMENTS

| 6,131,024 | A | 10/2000 | Boltz |
| 6,445,914 | B1 | 9/2002 | Findikli et al. |
| 6,753,887 | B2 | 6/2004 | Carolan et al. |

(Continued)

FOREIGN PATENT DOCUMENTS

| GB | 2292047 A | 2/1996 |
| KR | 2006039974 A | 5/2006 |

(Continued)

OTHER PUBLICATIONS

FAIPP Pre-Interview Communication dated Sep. 29, 2015, U.S. Appl. No. 14/163,035, filed Jan. 24, 2014.

(Continued)

*Primary Examiner* — Chuck Huynh

(57) ABSTRACT

A method for open mobile alliance (OMA) device management (DM) and over-the-air customization of a generic mobile device is disclosed. The method comprises receiving an activation message from the generic mobile device to register with a service provider, wherein the generic mobile device is pre-configured to support a plurality of functions. The method also comprises associating the generic mobile device with a service provider from the service providers as indicated by the activation message. The method further comprises sending one or more OMA service objects to customize the generic mobile device according to the service provider, wherein the one or more OMA service objects enable or disable each of the pre-configured functions on the generic mobile device to support one or more service features available by the service provider.

16 Claims, 8 Drawing Sheets

(56) References Cited

U.S. PATENT DOCUMENTS

| | | |
|---|---|---|
| 7,165,191 B1 | 1/2007 | Vakrat |
| 7,260,382 B1 | 8/2007 | Lamb et al. |
| 7,266,371 B1 | 9/2007 | Amin et al. |
| 7,493,111 B2 | 2/2009 | Knowles |
| 7,817,988 B2 | 10/2010 | Kruis et al. |
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 8,938,436 B2 | 1/2015 | Kozempel |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0135144 A1* | 6/2006 | Jothipragasam .. H04M 3/42289 455/419 |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Reddy et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1* | 3/2009 | Fleischman ......... H04L 41/0809 455/419 |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |

(56) References Cited

U.S. PATENT DOCUMENTS

| | | |
|---|---|---|
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142327 A1 | 6/2012 | Urbanek |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0137417 A1 | 5/2013 | Urbanek |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |

FOREIGN PATENT DOCUMENTS

| | | |
|---|---|---|
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 10/2014 |
| WO | WO2015030945 A1 | 3/2015 |
| WO | WO2015060965 A2 | 4/2015 |

OTHER PUBLICATIONS

FAIPP Pre-Interview Communication dated Mar. 4, 2015, U.S. Appl. No. 14/010,518, filed Aug. 27, 2013.

Notice of Allowance dated May 8, 2015, U.S. Appl. No. 14/010,518, filed Aug. 27, 2013.

FAIPP Pre-Interview Communication dated Apr. 1, 2015, U.S. Appl. No. 14/010,522, filed Aug. 27, 2013.

Notice of Allowance dated Jul. 8, 2015, U.S. Appl. No. 14/010,522, filed Aug. 27, 2013.

FAIPP Pre-Interview Communication dated Apr. 3, 2015, U.S. Appl. No. 14/010,523, filed Aug. 27, 2013.

Notice of Allowance dated Jun. 26, 2015, U.S. Appl. No. 14/010,523, filed Aug. 27, 2013.

FAIPP Pre-Interview Communication dated Mar. 10, 2015, U.S. Appl. No. 14/010,524, filed Aug. 27, 2013.

Notice of Allowance dated Apr. 28, 2015, U.S. Appl. No. 14/010,524, filed Aug. 27, 2013.

Restriction Requirement dated May 21, 2015, U.S. Appl. No. 14/073,321, filed Nov. 6, 2013.

FAIPP Pre-Interview Communication dated Aug. 20, 2015, U.S. Appl. No. 14/073,321, filed Nov. 6, 2013.

Notice of Allowance dated Nov. 4, 2015, U.S. Appl. No. 14/073,321, filed Nov. 6, 2013.

FAIPP Pre-Interview Communication dated Apr. 8, 2015, U.S. Appl. No. 14/157,507, filed Jan. 16, 2014.

First Action Interview Office Action dated Oct. 16, 2015, U.S. Appl. No. 14/157,507, filed on Jan. 16, 2014.

FAIPP Pre-Interview Communication dated Oct. 7, 2015, U.S. Appl. No. 14/075,687, filed Nov. 8, 2013.

FAIPP Pre-Interview Communication dated Nov. 19, 2015, U.S. Appl. No. 14/297,429, filed Jun. 5, 2014.

FAIPP Pre-Interview Communication dated Jul. 15, 2015, U.S. Appl. No. 14/163,041, filed Jan. 24, 2014.

FAIPP Pre-Interview Communication dated Sep. 21, 2015, U.S. Appl. No. 14/231,718, filed Mar. 31, 2014.

FAIPP Pre-Interview Communication dated Jul. 8, 2015, U.S. Appl. No. 14/475,399, filed Sep. 2, 2014.

Notice of Allowance dated Dec. 4, 2015, U.S. Appl. No. 14/475,399, filed Sep. 2, 2014.

Supplemental Notice of Allowability dated Dec. 14, 2015, U.S. Appl. No. 14/475,399, filed Sep. 2, 2014.

FAIPP Pre-Interview Communication dated Nov. 4, 2015, U.S. Appl. No. 14/619,677, filed Feb. 11, 2015.

Notice of Allowance dated Dec. 11, 2015, U.S. Appl. No. 14/619,677, filed Feb. 11, 2015.

Foreign Communication from a Related Counterpart—International Search Report and Written Opinion, dated Feb. 29, 2012, PCT/US2011/063736, filed on Dec. 7, 2011.

Foreign Communication from a Related Counterpart Application, "Preliminary Report on Patentability", dated Jun. 20, 2013, PCT/US2011/063736, filed on Dec. 7, 2011.

Foreign Communication from a Related Counterpart—International Search Report and Written Opinion, dated Jul. 24, 2013, PCT/US13/40278, filed on May 9, 2013.

(56) References Cited

OTHER PUBLICATIONS

Foreign Communication from a Related Counterpart Application, "Preliminary Report on Patentability," dated Nov. 20, 2014, PCT/US13/40278, filed on May 9, 2013.
Foreign Communication from a Related Counterpart—International Preliminary Report and Written Opinion, dated Nov. 14, 2013, PCT/US13/55023, filed on Aug. 15, 2013.
Foreign Communication from a Related Counterpart—International Preliminary Report on Patentability, dated Apr. 2, 2015, PCT/US13/55023, filed on Aug. 15, 2013.
Foreign Communication From a Related Counterpart Application, International Search Report and Written Opinion dated Jan. 24, 2014, PCT/US13/68981, filed on Nov. 7, 2013.
Foreign Communication From a Related Counterpart Application, International Preliminary Report on Patentability dated Jul. 30, 2015, PCT/US13/68981, filed on Nov. 7, 2013.
Foreign Communication From a Related Counterpart—International Search Report and Written Opinion, dated May 19, 2014, PCT/US14/13936, filed on Jan. 30, 2014.
Foreign Communication From a Related Counterpart Application, International Preliminary Report on Patentability dated Aug. 20, 2015, PCT/US14/13936, filed on Jan. 30, 2014.
Foreign Communication From a Related Counterpart—International Search Report and Written Opinion, dated May 14, 2014, PCT/US14/13939, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart—International Search Report and Written Opinion, dated Jun. 3, 2014, PCT/US14/16650, filed on Feb. 16, 2014.
Foreign Communication From a Related Counterpart Application, International Preliminary Report on Patentability dated Sep. 24, 2015, PCT/US14/16650, filed on Feb. 16, 2014.
Foreign Communication From a Related Counterpart—International Search Report and Written Opinion, dated Dec. 17, 2014, PCT/US14/46773, filed on Jul. 16, 2014.
Foreign Communication From a Related Counterpart—International Search Report and Written Opinion, dated Dec. 30, 2014, PCT/US14/56778, filed on Sep. 22, 2014.
Amazon Kindle e-book reader, on public sale 2007, http://en.wikipedia.org/wiki/Amazon_Kindle. last accessed on Apr. 13, 2015.
Dummies, "Power Modes on Your Kindle Paperwhite", http://dummies.com/how-to/content/power-modes-on-your-kindle-paperwhite.htm, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Annan, Brandon C., et al., "Electronic Fixed Brand Labeling," filed Feb. 8, 2013, U.S. Appl. No. 13/763,443.
Ghoshal, Jagannath, et al., "Rebranding a Portable Electronic Device While Maintaining User Data," filed May 22, 2013, U.S. Appl. No. 13/899,567.
Ghoshal, Jagannath, et al., "Multi-Step Mobile Device Initiation with Intermediate Partial Reset," filed Aug. 6, 2015, U.S. Appl. No. 14/820,522.
Indurkar, Dhananjay, "System and Method of Branding a Device Independent of Device Activation," filed Jan. 24, 2014, U.S. Appl. No. 14/163,035.
Sumner, Bret D., "Directing Server Connection Based on Location Identifier," filed Aug. 15, 2013, U.S. Appl. No. 13/968,259.
Callan, Jeffery S., et al., "Delivery of Oversized Branding Elements for Customization," filed Nov. 6, 2013, U.S. Appl. No. 14/073,321.
Indurkar, Dhananjay, "Background Delivery of Device Configuration and Branding," filed Jan. 16, 2014, U.S. Appl. No. 14/157,507.
Ahn, Chul Jin, et al., "Separation of Client Identification Composition from Customization Payload to Original Equipment Manufacturer Layer," filed Nov. 8, 2013, U.S. Appl. No. 14/075,687.
Ghoshal, Jagannath, et al., "Multiple Carrier Partition Dynamic Access on a Mobile Device," filed Jun. 5, 2014, U.S. Appl. No. 14/297,429.
Indurkar, Dhananjay, "Activation Sequence Using Permission Based Connection to Network," filed Jan. 24, 2014, U.S. Appl. No. 14/163,041.
Ahn, Chul Jin, et al., "Customization for Preloaded Applications," filed Mar. 31, 2014, U.S. Appl. No. 14/231,718.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin R, et al. "System and Method of Efficient Mobile Device Network Brand Customization," filed Sep. 2, 2014, U.S. Appl. No. 14/475,399.
Ghoshal, Jagannath, et al., "Dynamic Subscriber Identity Module," filed Feb. 11, 2015, U.S. Appl. No. 14/619,677.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
Foreign Office Action dated Jul. 7, 2015, Japanese Application Serial No. 2013-543310, filed Jul. 7, 2015.
FAIPP Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
FAIPP Pre-Interview Communication dated Sep. 22, 2014, U.S. Appl. No. 13/468,028, filed May 9, 2012.
First Action Interview Office Action dated Mar. 16, 2015, U.S. Appl. No. 13/468,028, filed May 9, 2012.
Final Office Action dated Nov. 4, 2015, U.S. Appl. No. 13/468,028, filed May 9, 2012.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Jun. 2, 2015, U.S. Appl. No. 14/152,627, filed Jan. 10, 2013.
Notice of Allowance dated Aug. 6, 2015, U.S. Appl. No. 14/152,627, filed Jan. 10, 2013.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
Notice of Allowance dated Jul. 15, 2015, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
Notice of Allowance dated Jul. 7, 2015, U.S. Appl. No. 14/522,586, filed Oct. 24, 2014.

(56) References Cited

OTHER PUBLICATIONS

FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
FAIPP Pre-Interview Communication dated Apr. 8, 2015, U.S. Appl. No. 13/844,104, filed Mar. 15, 2013.
Notice of Allowance dated Jul. 16, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
FAIPP Pre-Interview Communication dated Apr. 23, 2014, U.S. Appl. No. 13/763,443, filed Feb. 8, 2013.
First Action Interview Office Action dated Jun. 16, 2015, U.S. Appl. No. 13/763,443, filed Feb. 8, 2013.
Final Office Action dated Aug. 10, 2015, U.S. Appl. No. 13/763,443, filed Feb. 8, 2013.
Advisory Action dated Nov. 3, 2015, U.S. Appl. No. 13/763,443, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
Office Action dated Jun. 16, 2015, U.S. Appl. No. 13/899,567, filed May 22, 2013.
Notice of Allowance dated Oct. 26, 2015, U.S. Appl. No. 13/899,567, filed May 22, 2013.
FAIPP Pre-Interview Communication dated Mar. 12, 2015, U.S. Appl. No. 13/972,827, filed Aug. 21, 2013.
Notice of Allowance dated May 7, 2015, U.S. Appl. No. 13/972,827, filed Aug. 21, 2013.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
FAIPP Pre-Interview Communication dated Apr. 15, 2015, U.S. Appl. Nos. 14/085,474, (14/060,712), filed Nov. 20, 2013.
Notice of Allowance dated May 29, 2015, U.S. Appl. No. 14/085,474, filed Nov. 20, 2013.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.

* cited by examiner

GENERIC MOBILE DEVICES CUSTOMIZATION FRAMEWORK

CROSS-REFERENCE TO RELATED APPLICATIONS

This application is a divisional of and claims priority under 35 U.S.C. §119 to U.S. patent application Ser. No. 13/622,234, filed on Sep. 18, 2012, entitled "Generic Mobile Devices Customization Framework," by Robert E. Urbanek, which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a method for open mobile alliance (OMA) device management (DM) and over-the-air customization of a generic mobile device is disclosed. The method comprises receiving an activation message from the generic mobile device to register with a service provider, wherein the generic mobile device is pre-configured to support a plurality of functions. The method also comprises associating the generic mobile device with a service provider from the service providers as indicated by the activation message. The method further comprises sending one or more OMA service objects to customize the generic mobile device according to the service provider, wherein the one or more OMA service objects enable or disable each of the pre-configured functions on the generic mobile device to support one or more service features available by the service provider.

In an embodiment, a server for over-the-air configuration of a generic mobile device is disclosed. The server comprises at least one processor, a memory, and an application stored in memory that, when executed by the at least one processor, receives an activation message from the generic mobile device that is pre-configured to support a plurality of service features for a plurality of service providers. In response to receiving the activation message, the application registers the generic mobile device to a service provider from the service providers indicated by the activation message. The application then determines a plurality of service features provided by the service provider. The application further verifies whether the generic mobile device is pre-configured to support the service features. The application sends a plurality of service objects that customize the generic mobile device to support the service features if the generic mobile device is not pre-configured to support the service features.

In an embodiment, a generic mobile device pre-configured to support a plurality of service features for a plurality of service providers is disclosed. The generic mobile device comprises at least one processor, a read only memory, a plurality of parameters stored in the read only memory that configure a plurality of functions of the generic mobile device, and an application stored in the read only memory that, when executed by the at least one processor, sends an activation message to a server to register with a service provider from the service providers. In response to the activation message, the application receives an OMA DM message comprising a plurality of service objects from the server. The application then processes the service objects to enable or reconfigure at least some of the functions that support the service features of the service provider and disable the remaining functions that support the remaining service features that are not supported by the service provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
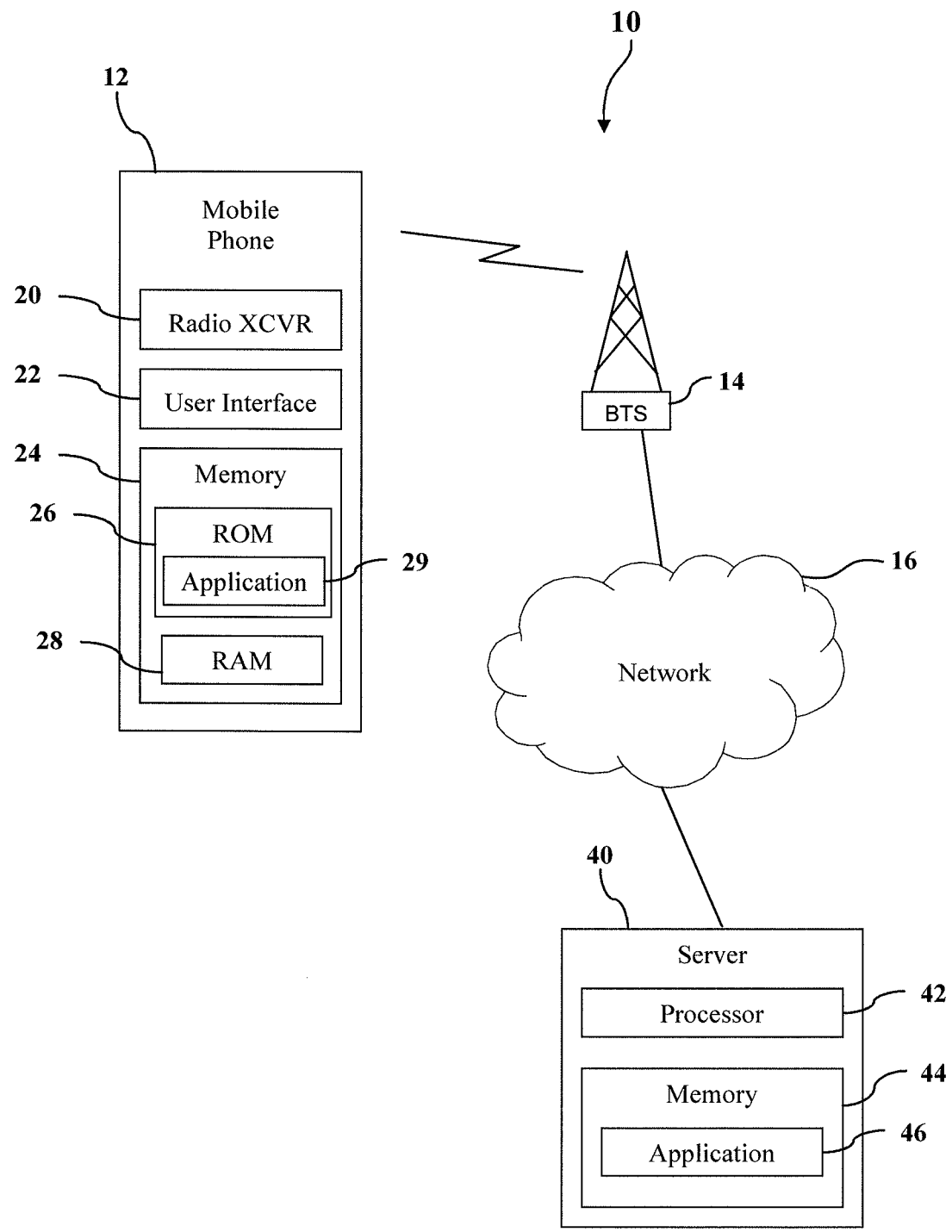
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Unique device customizations for different models, brands, colors, and/or other features of mobile devices, such as cellular telephones and smartphones, may lead to applying separate stock keeping unit numbers for each distinct product that can be purchased. The distinct products with separate stock keeping unit numbers may introduce complexity to inventory management and distribution. For example, even similar devices that have few distinguished features, such as different branding and/or colors, may be assigned different stock keeping unit numbers. The distinct products may belong to different mobile service carriers or providers and may be customized accordingly. The providers' different customizations may include different product packaging, including boxes or packages, manuals, and/or accessories. Device customization may also include branding using physical labels positioned on the exterior device, digital labels displayed on the device screen, or both. The customization may also include configurations related to device look and feel, such as configurations for device displayed graphics, device menu designs and appearances, sound and tone selections, etc. The customization may also include configurations related to device functions and applications that support service features of the different carriers or providers, including messaging features, calling features, roaming features, or any other operational features of the devices. Each different combination of customization options may involve extensive testing and certification, which may create a considerable overhead cost that adds to the actual hardware cost of the mobile devices, the packaging cost, and the inventory management and distribution cost.

Disclosed herein is a framework for generic mobile device customization based on a selected service provider and/or brand. The selected service provider and/or brand may be selected and/or identified in a variety of ways. For example, the service provider and/or brand may be identified in an activation message sent from the generic mobile device during initial power-on. The generic mobile device may self-determine the service provider and/or brand at initial power-on. For further details of self-identification of service provider and/or brand by a generic mobile phone, see U.S. patent application Ser. No. 13/468,028, filed May 9, 2012, entitled "Self-identification of Brand and Branded Firmware Installation in a Generic Electronic Device," by Robert H. Burcham, et al., which is incorporated herein by reference in its entirety. Alternatively, the selected service provider and/or brand may be identified in a memory storage location of the generic mobile phone. Alternatively, the service provider may be determined by a provisioning server that searches a data store using identifying information of the generic mobile phone to find a service provider associated with that identifying information in the data store. The identifying information may be hardware identifiers such as a mobile subscriber number (MSN), and electronic serial number (ESN), or other identifying information.

The generic mobile device may be a cellular telephone, a smartphone, or a similar device configured for wireless communications and sold for different service carriers or providers. The generic mobile device may use an open mobile alliance (OMA) device management (DM) protocol to exchange messages with a server or a network for device management and configuration purposes. A plurality of functions and applications may be pre-configured on the generic mobile device prior to activation. For example, a plurality of function parameters and application code may be embedded in the device's firmware. The system may comprise a configuration server that communicates with the device during the device's activation process. During the activation, the device may register with a service provider, and the configuration server may customize the device based on the selected service provider's available service features using an over-the-air configuration process and the OMA DM protocol.

The server may determine which of the device's pre-configured functions and applications support the service features of the service provider and hence enable such functions and applications on the device. The service features may include voice calling options, roaming options, messaging options, or other operational features and options for the different providers. For instance, the pre-configured functions and applications may be disabled (switched off) before enablement. If the pre-configured functions/applications are already enabled on the device, then the server may not change such functions/applications. The server may also disable other functions/applications on the device that may not be needed or may conflict with the service features of the service provider. In some cases, the server may add or reconfigure function/applications on the device to support the service features, as described further below. In order to enable, disable, add, or reconfigure the functions/applications on the device, the server may send a plurality of objects in one or more OMA DM messages, which may be received and processed by the device to switch the functions/applications on or off accordingly. For instance, the objects may include flags that indicate whether corresponding functions/applications should be turned on or off. The objects may also include some parameters that may be used to add or reconfigure function/applications on the device appropriately.

This over-the-air customization scheme may remove or reduce the need for unique customizations for different products by different providers during device manufacturing or assembly. A single generic product that may be assigned a generic stock keeping unit number may be pre-configured (during its manufacture or assembly phase) with a set of applications and functions that meet service features across the different providers. The scheme may comprise identifying the customization options that are used across multiple customizations or versions of a generic mobile device for different service carriers or providers. The functions, applications, and other features (such as feel and look configurations) across the different customizations or versions may be embedded in the firmware delivered with the generic mobile device, also referred to herein as a generic firmware. Embedded functions and applications in the mobile device may have such functions and applications readily available, tested, and certified for use for use without the need to download them from one or more servers and certified. This may ensure better performance and no or fewer errors (bugs) on the mobile device and may be more convenient for the user, since the user would not need to spend time and effort to download and test the functions and applications. The embedded function parameters, application code, and other features in the generic firmware may be initially enabled or disabled, for example based on criteria such as the intended or potential providers of the generic mobile device. This may allow an original equipment manufacturer (OEM) to deliver an out-of-the-box default configuration with minimal or no customization, which may be sold for use with a wide range of providers that may have similar or different service features.

Subsequently, a service provider may, through an enhanced configuration process, add customization and configuration as needed at the time of service activation of the mobile device. During the device activation, the device may be customized for a provider using the OMA DM protocol by enabling, adding, or reconfiguring the functions and applications appropriate for that provider. Other functions and applications that may be pre-configured on the device and that are not suitable or needed for the service features of the provider may be disabled. This over-the-air customization scheme may reduce packaging, inventory, distribution, testing, and/or customization cost and may simplify device customization and configuration for a service provider.

In an embodiment, firmware may be stored in a read only memory of the generic mobile device such that the firmware is not readily altered or over written by general users of the device. Typically, general users of a mobile device may be prevented from readily altering, deleting, and/or downloading firmware to the device to avoid compromising the basic functions of the device. Firmware embedded configuration data (embedded function and application parameters) may be contrasted with other configuration data, which in some cases may be readily written into, changed in, or deleted from a memory of the generic mobile device by a user, for example by using an interface for configuring the device and/or applications. Additionally, firmware embedded applications may be contrasted with other applications that may be downloaded to, stored on, executed on, and deleted from the mobile device by a user.

FIG. 1 illustrates an embodiment of a communication system 10 that may implement the over-the-air customization scheme for a generic mobile device. The system 10 may comprise a mobile device or phone 12, a base transceiver station (BTS) 14, a network 16, and a service awareness provisioning server 40. The mobile device or phone 12 may be a mobile phone, a personal digital assistant (PDA), a media player, or other wireless communication enabled portable electronic device. In an embodiment, the mobile phone 12 may be implemented as a handset. Details of handsets are discussed further hereinafter. The base transceiver station 14 provides a wireless communication link to the mobile phone 12 and couples the mobile phone 12 to the network 16. In an embodiment, the base transceiver station 14 provides a wireless communication link to the mobile phone 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of mobile phones 12. The network 16 may be a public communication network, a private communication network, or a combination thereof.

The mobile phone 12 may comprise a radio transceiver 20, a first user interface 22, and a first memory 24. Alternatively, the mobile phone 12 may comprise two or more radio transceivers 20. The first memory 24 may comprise a first read only memory (ROM) 26, and a first random access memory (RAM) 28. The service awareness provisioning server 40 may comprise a processor 42, a memory 44, and an application 46 stored in the memory 44. The service awareness provisioning server 40 may also comprise a plurality of processors located in a plurality of computers. Computers are discussed in more detail hereinafter.

The application 46, when executed by a processor 42 of the service awareness provisioning server 40, may receive an activation message from a mobile phone 12, which may be one of a plurality of generic mobile phones 12, to register with a service provider. The application 46 may link the service provider to the mobile phone 12 by looking up in a data store (not shown) a wireless communication service provisioned for the mobile phone 12 using a phone number of the first mobile phone 12, an electronic serial number of the first mobile phone 12, a mobile subscriber number (MSN) of the first mobile phone 12, other identifying information of the first mobile phone 12, or combinations thereof. Such identifying information may be included in the activation message. Thus, the application 46 may identify the service provider and a plurality of service features provided by the service provider.

The activation message may also indicate the model of the mobile phone 12. For example, the activation message may comprise the stock keeping unit number, electronic serial number, mobile subscriber number, and/or other identifying information of the mobile phone 12. The application 46 may identify the mobile phone 12 based on the identifying information and determine the pre-configured functions and applications on the mobile phone 12. For instance, the mobile phone identifying information may be matched in a database for mobile phone product information to a set of embedded function/application parameters and embedded application code associated with the generic mobile phone 12. Alternatively, the service awareness provisioning server 40 may communicate with the mobile phone 12 or the identified service provider to obtain this information.

The application 46 may then compare the embedded mobile phone information with the provider service feature information to determine which of the functions and parameters that are pre-configured on the mobile phone 12 are needed to support the service features. The pre-configured functions may be related to device connectivity features, including voice call functions, call roaming functions, texting or messaging functions, radio connectivity functions, data transfer functions, Internet or web browsing functions, television/video streaming functions, music streaming functions, cloud access functions, online gaming functions, other device functions related to or based on connectivity, or combinations thereof. The pre-configured functions may also be related to device own components and capability/operational features, such as video/image capture functions (camera functions), voice capture, recording, and dialing functions, and other input/output device functions. The pre-configured functions may be implemented by one or more processors of the device to enable the related features. Similarly, the pre-configured applications may be related to device connectivity features and/or device capability/operational features. The pre-configured applications may be accessed and used by a user of the device to enable the related features. Some of the pre-configured applications may access or implement some of the pre-configured functions and may provide the user interfaces to access or operate the pre-configured functions.

At least some of the pre-configured functions and applications, which may be embedded in the firmware of the mobile device 12, may be enabled (turned on), for example prior to the customization process. Some of the functions and applications embedded in the firmware may be disabled (turned off). The pre-configured functions and applications may be initially turned on or turned off using one or more activation status tables or other mapping data structures, for example in one or more files stored or accessed on the mobile device 12. The activation status tables or data structures may be used to indicate which pre-configured functions and applications are turned on and which are turned off. For instance, the activation status table may comprise a plurality of flags or indicators that map to the pre-configured functions and applications and that are set to indicate enabled functions/applications or that are not set to indicate disabled functions/applications. Alternatively, other schemes may be used to indicate enabled and disabled pre-configured functions and applications. For example, one or more lists or files of enabled pre-configured applications and functions may be stored and accessed on the mobile phone 12. As such, only the pre-configured functions and applications on the lists or files may be used on the mobile phone 12.

Examples of pre-configured functions related to device connectivity include a function for launching a Multimedia Messaging Service (MMS) or a Short Message Service (SMS) to obtain content on the mobile phone 12. The function may be pre-configured with parameters that determine the type of service (MMS or SMS) and the address (e.g., uniform resource identifier (URI) or Internet Protocol (IP) address) of the service to launch. Such functions may also include functions for activating one or more radio devices on the mobile phone 12 to establish one or more wireless communication links, such as Long Term Evolution (LTE), Code division multiple access (CDMA), and Worldwide Interoperability for Microwave Access (WiMAX) technologies. The functions may also include a function for launching a mail service to send/receive email. The pre-configured parameters of the mail service launching function may also determine the type and the address of the mail service. Other examples include functions for connecting to a customer service center and an emergency call center. Examples of pre-configured functions related to device components and capability/operational features include a function for operating a camera of the mobile phone 12 to capture an image or video, and a function for running a voice recorder of the mobile device 12.

Examples of pre-configured applications related to device connectivity features include an email application for composing, sending, and receiving emails, a messaging application for sending and receiving text messages and media, and a calendar application for scheduling events and reminders. Examples of pre-configured applications related to device components and capability/operational features include different applications that operate device input/output components, such as a video capturing application and a sound recording application. Other examples of the pre-configured applications include device menu and other screen display functions, including graphics, video, and/or sound features.

The pre-configured applications may also include an interface and applications pack (IAP). The interface and applications pack may comprise at least one of a media file, an application, a web widget, and a network service and may be used to customize the communication experience of using an electronic device (the mobile phone 12). An interface and applications pack may be viewed as an aggregated set of applications, web widgets, network services, ring tones, ringback tones, alerting tones, wallpapers, interface controls, and other content targeted for the electronic device. In some contexts, the interface and applications pack may be referred to as an identity (ID) pack or an ID zone. For instance, the interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems.

The interface and applications pack may provide media files that define wall papers and themes that change the look and sounds of the electronic device. For example, the interface and applications pack may include alerting tones that are played when selected events occur to alert a user that a simple message service message has been received or to alert the user to an event or the approach of an event germane to the subject interface and applications pack. The interface and applications pack may include a picture file that defines the background of the display of the electronic device to be a photographic view of picturesque mountains seen through a 2×4 frame structure for a storage shed. Further details about interface and applications packs are described in U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

The pre-configured functions and applications information may be embedded (in the form of code and/or parameters) in the firmware of the mobile phone, for instance in the first memory 24 or the ROM 26. In some embodiments, at least some functions and applications or information related to function and applications on the mobile phone 12 may be stored elsewhere, for example at a provider server that communicates with the service awareness provisioning server 40. The remotely stored information may be transported to the mobile phone 12 (e.g., to the first memory 24 or the random access memory 28) to enable the functions/applications on the mobile phone 12 via the service awareness provisioning server 40.

When the application 46 determines which of the pre-configured functions and parameters on the mobile phone 12 are needed to support the service features of the registered service provider, the application 46 or the service awareness provisioning server 40 may customize the mobile phone 12 accordingly using the OMA DM protocol and messages. The application 46 or the service awareness provisioning server 40 may customize the mobile phone 12 according to the service provider by configuring the functions/applications on the mobile phone 12. The service awareness provisioning server 40 may send a plurality of OMA service objects (e.g., fields or indicators in OMA DM messages and or OMA DM management objects) to enable the pre-configured functions/applications of the mobile phone 12 that support the service features of the provider. The OMA service objects may also be sent to disable other pre-configured functions/applications on the mobile phone 12 that do not support or conflict with the service features. The service awareness provisioning server 40 may also reconfigure or change some of the pre-configured functions/applications on the mobile device 12 using the OMA service objects to support the service features.

The OMA DM messages or the OMA service objects may comprise a plurality of flags or indicators that may be processed by the mobile device 12 to enable and disable the pre-configured functions/applications. For example, the flags may be set to enable corresponding functions/applications or may not be set to disable the corresponding functions/applications. For instance, the flags may be used by the mobile device 12 to modify pre-existing activation status mappings or lists or generate new activation status mappings on the mobile device 12 to indicate which of the embedded functions and applications are switched on and which are switched off. To reconfigure or change some of the pre-configured functions/applications, the OMA DM messages or OMA service objects may include function/application parameters, which may be used by the mobile phone 12 to reconfigure the embedded functions/applications.

When the mobile phone 12 receives the OMA DM messages or OMA service objects, the mobile phone 12 may process the flags, indicators, and/or parameters in the messages or objects to enable, disable, and/or change the functions/applications on the mobile phone 12 accordingly. The mobile phone 12 may comprise a customization application 29 that may be stored in the ROM 26 and run on a processor of the mobile phone 12 to process the messages or objects and configure the device functions/applications accordingly. The customization application 29 may be a dedicated application for processing the over-the-air OMA DM messages or objects from the service awareness provisioning server 40 for the purpose of customizing the mobile phone 12 according to a registered service provider. The customization application 29 may be a pre-configured application embedded in the memory 24 or the ROM 26 and/or downloaded from the service awareness provisioning server 40 and loaded in the random access memory 28 of the mobile phone 12. The mobile phone 12 or the customization application 29 may enable/disable the pre-configured functions/applications of the mobile phone 12 based on a plurality of corresponding flags received in the OMA DM messages or objects. The mobile phone 12 or the customization application 29 may also reconfigure the embedded functions/applications using corresponding parameters received in the OMA DM messages or objects. The configuration information in the OMA DM messages or objects (e.g., the flags/parameters) may be processed on the mobile phone 12 in a transparent manner from the user of the device without affecting the user behavior and operations on the device. The mobile phone 12 may be configured using such information automatically and without waiting for confirmation from the user. In some embodiments, the customization process may not be changed or altered by the user to prevent conflict with the service features provided or supported by the service provider.

In one example of enabling/disabling pre-configured functions of the mobile phone 12, the service awareness provisioning server 40 may determine that the service provider supports the SMS but not the MMS. Thus, the service awareness provisioning server 40 may send an OMA DM message or object comprising flags that enable the SMS function and disable the MMS function on the mobile phone 12. When the mobile phone 12 receives the message or object, the customization application 29 of the mobile phone 12 may process the flags to turn off the MMS function. Additionally or alternatively, the message or object may comprise parameters for configuring the messaging based functions/applications on the mobile phone 12 to implement the SMS instead of the MMS. This configuration may implemented by the mobile device 12 without the user knowing (e.g., without prompting the user) and may not affect the user operation of the mobile phone 12. Other examples for configuring the device functions include how to display items and graphics on the mobile phone, such as how to display a turn-on splash screen, a turn-on tone, a turn-off splash screen, a turn-off tone or combinations thereof on the mobile phone 12.

In another example, the OMA DM messages or objects may comprise flags and parameters that may be processed on the mobile phone 12 to turn on or off one or more radios for establishing different wireless link technologies, as available by service providers. For example, some service providers may support all the connectivity functions (via different radios, antennas, or transceivers) of the mobile device 12, such as LTE, WiMAX, CDMA, and/or GSM. In that case, such radios or functions may all be enabled on the mobile phone 12 using the over-the-air scheme. For other service providers that support or one or some of the available radio functions on the mobile phone 12, the service awareness provisioning server 40 may disable all other radio functions that may be configured on the mobile phone 12, which may save battery power. Some pre-configured functions, such as call roaming may also be disabled on the mobile phone 12 by the service awareness provisioning server 40 if the registered service provider does not support such feature. Such functions may be enabled or disabled by the mobile phone 12 upon processing the OMA DM messages without prompting the user. However, a message may be displayed on the mobile phone 12 after activating such functions or upon attempt to launch such disable functions by the user.

In yet another example, the service awareness provisioning server 40 may send parameters to the mobile phone 12 to enable, disable, or change button functions on the mobile phone 12. For instance, an originally pre-configured shutdown button on the mobile phone 12 may be reconfigured to put the mobile phone 12 on hold or in sleep mode instead of complete shutdown to maintain a minimum amount of communications as desired by the registered provider. A button may also be reconfigured to launch different applications that are determined according to the registered service provider. Some functions of the mobile phone 12 may also be disabled as desired by a service provider, for example for determined customers. For example, some fleet accounts for drivers (e.g., mail or truck delivery drivers, limousine drivers, etc.) may prefer the disablement of video play functions and/or camera functions on the mobile phone 12 for security reasons. Parental control functions may also be enabled or disabled depending on whether such features are offered by the service provider. In another example, one or more call numbers or website addresses (e.g., universal reference locators or URLs) may be set for accessing features and services, such voice mail, customer support, emergency center, digital mall, music and ringtone store, video store, display or theme lists, and other display and digital tools and options related to look and feel.

Similarly, pre-configured applications on the mobile phone 12 (embedded applications) may be enabled or disabled depending on whether such applications are supported by the registered service provider. An embedded interface and applications pack may be configured over-the-air using the OMA DM message to change the device access to service features and application packages that may be offered by the registered provider of the mobile phone 12. A service address or ID may be changed or configured on the mobile phone 12 to direct the mobile phone 12 to a server for downloading such applications or services. Such configuration may be transparent to the user.

A plurality of generic mobile phones 12 may be certified by a single certification process, thereby reducing certification costs for the original equipment manufacturer. In an embodiment, the generic mobile phone 12 has an ANDROID execution platform installed, and the preconfigured functions and applications may be certified for use on the ANDROID execution platform. Since the pre-configured functions and applications are certified for the execution platform, they do not need to be recertified for a specific generic mobile phone model associated with a specific service provider. In an embodiment, the generic mobile phones 12 may be associated with one stock keeping unit number, which may enable better economies of scale and simplify inventory management. Better economies of scale may be attained, for example, by buying one million units of the generic mobile phone 12 from an original equipment manufacturer rather than buying one hundred thousand units of each of ten different customized mobile phones from the same original equipment manufacturer. Likewise, better economies of scale may be attained in stocking inventory at retail stores and/or at distribution centers.

For example, if it is customary to keep ten units of each different phone model on hand in a retail store and there are fifty different phone models, this equates to an inventory of five hundred phones. If the weekly turn over of phones is about one hundred, however, it may be possible to stock an inventory of two hundred generic phones and keep up with purchasing demand, but with a considerably reduced investment in inventory stock. Ordering phones to restore inventory becomes simpler because sales of fifty different models of phone do not have to be separately stocked. The same example may readily be applied to a distribution center, perhaps resulting in an even greater percentage of inventory reduction than could be realized in the case of the retail stores.

Other advantages of the over-the-air customization process is the configuration of the mobile devices upon activation without the need of updating the device firmware, for example using .pri files or other firmware update files. For instance, the flags and parameters in the OMA DM messages or service objects may be processed in the random access memory 28 or the memory 24 without rewriting or changing the device firmware. As such, the original embedded code for the pre-configured applications and functions may remain intact and may be operated by the mobile phone 12 in view of the obtained customization information from the service awareness provisioning server 40, which may also be stored and maintained on the mobile phone 12. In an embodiment, a reactivation process of the mobile phone 12, such as with a different service provider may change the customization of the embedded functions and applications. The customization application 29 may be added to the mobile phone 12, for example as an embedded application in the firmware or a downloaded application from the application 46, to properly process the customization information.

FIG. 1 illustrates a communication system 10 including a wireless communication link between the mobile phone 12 and the network 16. It should be noted that the service awareness provisioning server 40 may also reside in a distribution center or warehouse, and that some or all customization process of the mobile phone 12 may be completed in the distribution center. This would allow customization to be accomplished prior to sending a plurality of mobile phones 12 to a retail point of sale or a large enterprise customer, for example.

Figure 2:
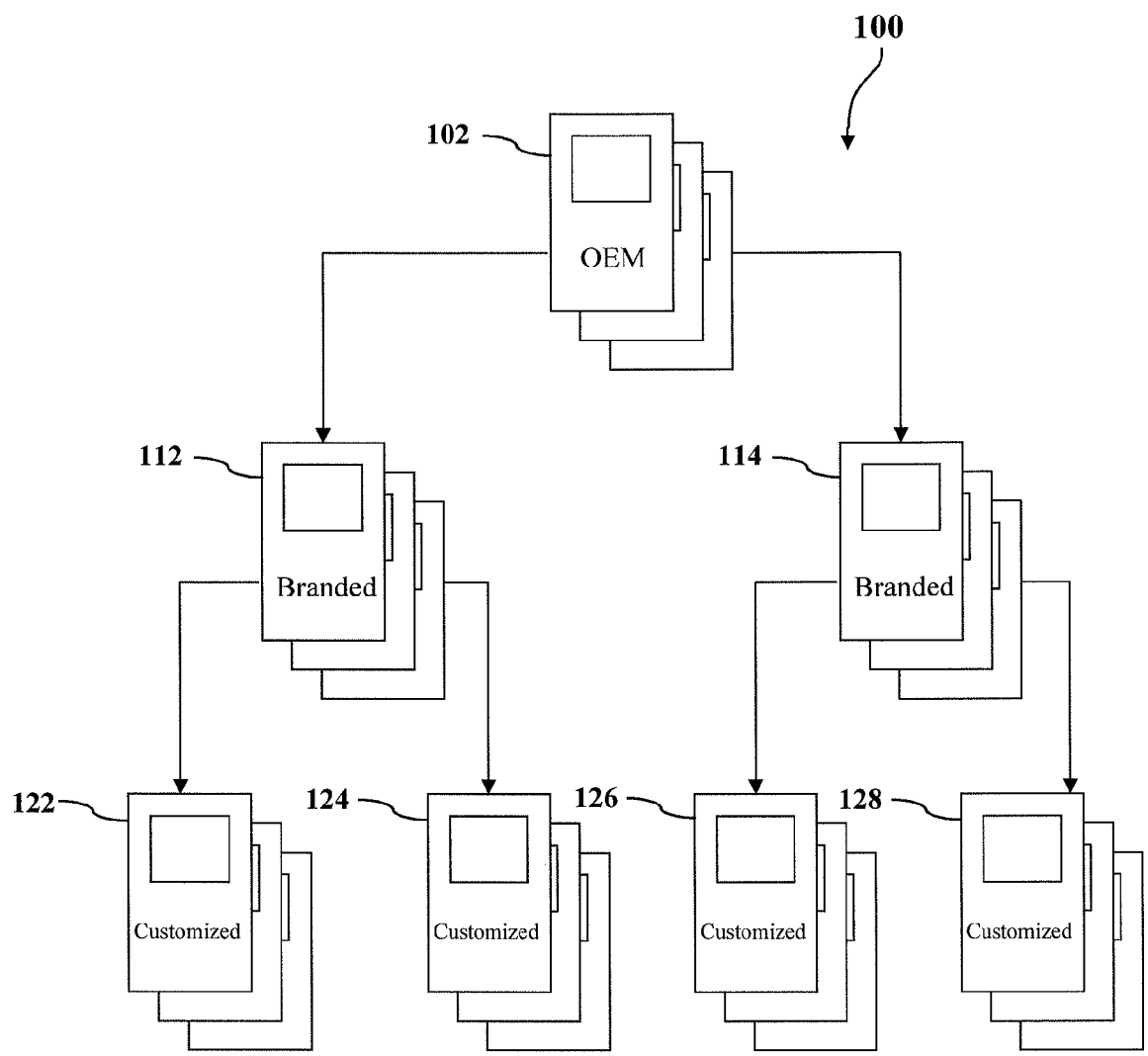
FIG. 2 is an illustration of levels of device configuration according to an embodiment of the disclosure.

FIG. 2 illustrates an embodiment of levels of device configuration hierarchy 100 that display how the customization process can take a generic device and transform it into a customized device. The hierarchy 100 may comprise a plurality of generic mobile phones 102, which may branch off at a first level to a plurality of first service brand mobile phones 112 and a plurality of second service brand mobile phones 114. The first service brand mobile phones 112 may then branch off into a plurality of first customized mobile phones 122 and a plurality of second customized mobile phones 124. The second service brand mobile phones 114 may also branch off into a plurality of third customized mobile phones 126 and a plurality of fourth customized mobile phones 128. The original equipment manufacturer may deliver a single generic configuration to one or more service providers, allowing a single certification and a single stock keeping unit, for example for each service provider. Each service provider may support a plurality of brands, for example various phone products under different name brands for different operators or sub-carriers. Further, under each brand, different models that provide some different services, applications, and functions may be customized for different customer groups or types.

The service provider may utilize an over-the-air provisioning process, as described in U.S. patent application Ser. No. 12/962,620 filed Dec. 7, 2010 by Robert E. Urbanek and entitled "System and Method of Wireless Communication," which is incorporated herein by reference as if reproduced in its entirety, to update the generic mobile phones 102 and create the first plurality of branded mobile phones 112 and the second plurality of mobile branded phones 114, wherein the configuration is now unique for each brand. Additionally, within each brand further customization may be accomplished using the over-the-air customization process described above. As such, the first plurality of branded mobile phones 112 may be customized to create the first plurality of customized mobile phones 122 and the second plurality of customized mobile phones 124, and the second plurality of branded mobile phones 114 may be customized to create the third plurality of customized mobile phones 126 and the fourth plurality of customized mobile phones 128. For example, within a brand, the service provider may have requirements to customize the first plurality of branded mobile phones 112 with functions and applications that support provider service features specific for a large enterprise customer, or may want to target a particular customer demographic with a customized mobile phone model.

In an embodiment, a first customized mobile phone 122 may be deactivated, after having previously been activated. The first customized mobile phone 122 may be restored to the factory generic mobile phone 102 settings from a first read only memory of the first branded mobile phone 112. The first generic mobile phone 102 may then be reactivated, and in response to reactivating the first generic mobile phone 102, a new service brand may be identified and associated with the first generic mobile phone 102 and a new over-the-air customization process may be implemented. In this manner a service provider may support transfer of phone inventory between brands and customization models without firmware reflashing. The current practice has mobile phones being delivered already branded and customized in the firmware, with no means to make the phones generic or non-customized. A separate firmware may need to be loaded on the phones to re-customize them, making it a difficult and costly process to transfer phone inventory to another customization model, brand, or service provider. In an embodiment, the factory generic mobile phone 102 settings may be stored in the read only memory of the first branded mobile phone 112 and the first customized mobile phone 122 in compressed format.

Figure 3:
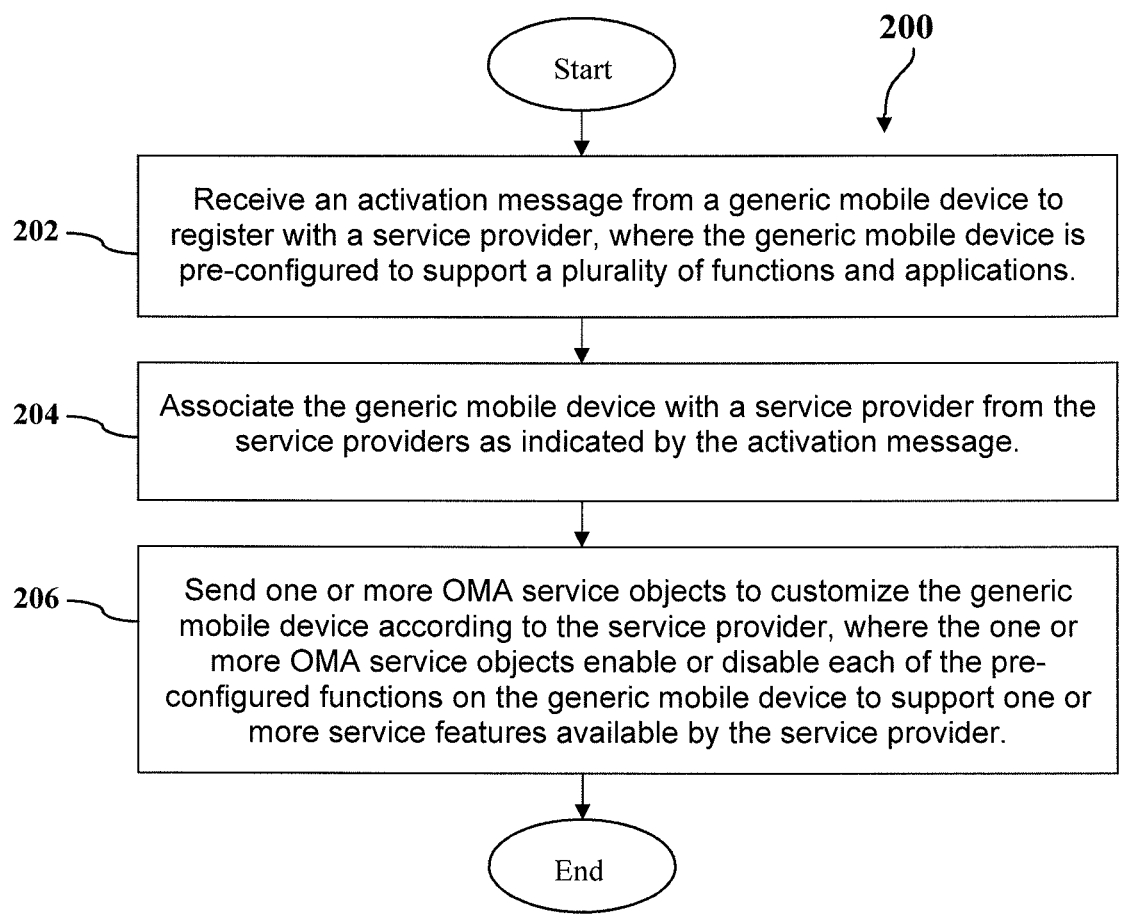
FIG. 3 is a flow chart of a method for over-the-air mobile device customization according to an embodiment of the disclosure.

FIG. 3 illustrates an embodiment of a method 200 for over-the-air mobile device customization on the server side of a communication system. For instance, the over-the-air customization method 200 may be implemented by the service awareness provisioning server 40 to customize the mobile phone 12 upon activation and registration with a service provider to support the service provider service features available for a customer (a user of the mobile phone 12). At block 202, an activation message may be received from a generic mobile device to register with a service provider, where the generic mobile device is pre-configured to support a plurality of functions and applications. The mobile device may be a mobile phone (a handset, a smartphone, etc.) or any other electronic mobile device used for wireless communications. For example, a generic mobile phone 12 may send a registration message to the service awareness provisioning server 40 to register with a service provider associated with the server 40. The generic mobile phone 12 may comprise a plurality of embedded functions and applications in the device firmware, for example in the form of digital code and hardware function parameters. The pre-configured functions and applications may support service features across various service providers. Some of the service features may not be supported by the indicated service provider in the registration method, and thus may not be needed or may conflict with the service features available or provided by the indicated provider. At block 204, the generic mobile device may be associated with a service provider from the service providers as indicated by the activation message. For example, the service awareness provisioning server 40 may determine the service provider for the mobile phone 12 by looking up in a data store a wireless communication service provisioned for the mobile phone 12 based on a phone number, an electronic serial number, a mobile subscriber number, or combinations thereof of the mobile phone 12. This information may be sent in the activation message. The service awareness provisioning server 40 may also use a stock keeping unit number, an electronic serial number, and/or a mobile subscriber number in the activation message to identify the model of the mobile phone 12 and determine the pre-configured functions/applications on the mobile phone 12. This information may be obtained from a data store or from the service provider.

At block 206, one or more OMA service objects may be sent to customize the generic mobile device according to the service provider, where the one or more OMA service objects enable or disable each of the pre-configured functions on the generic mobile device to support one or more service features available by the service provider. For example, the service awareness provisioning server 40 may determine the service features available or offered by the provider to the mobile phone 12 model and compare such service features to the current configurations of the embedded functions and applications on the mobile device 12. Some of the service features may be supported by the current configurations while other remaining features may not be supported or may conflict with the current configurations. Thus, the service awareness provisioning server 40 may customize the mobile phone 12 by enabling the pre-configured functions and applications that support the service features and disable the other remaining functions/applications that do not support the service features or are not supported by the available provider services. For example, the service awareness provisioning server 40 may send OMA service objects that comprise a plurality of flags corresponding to the pre-configured functions/application on the mobile phone 12. The flags may be set to enable and disable the corresponding functions/applications appropriately.

Figure 4:
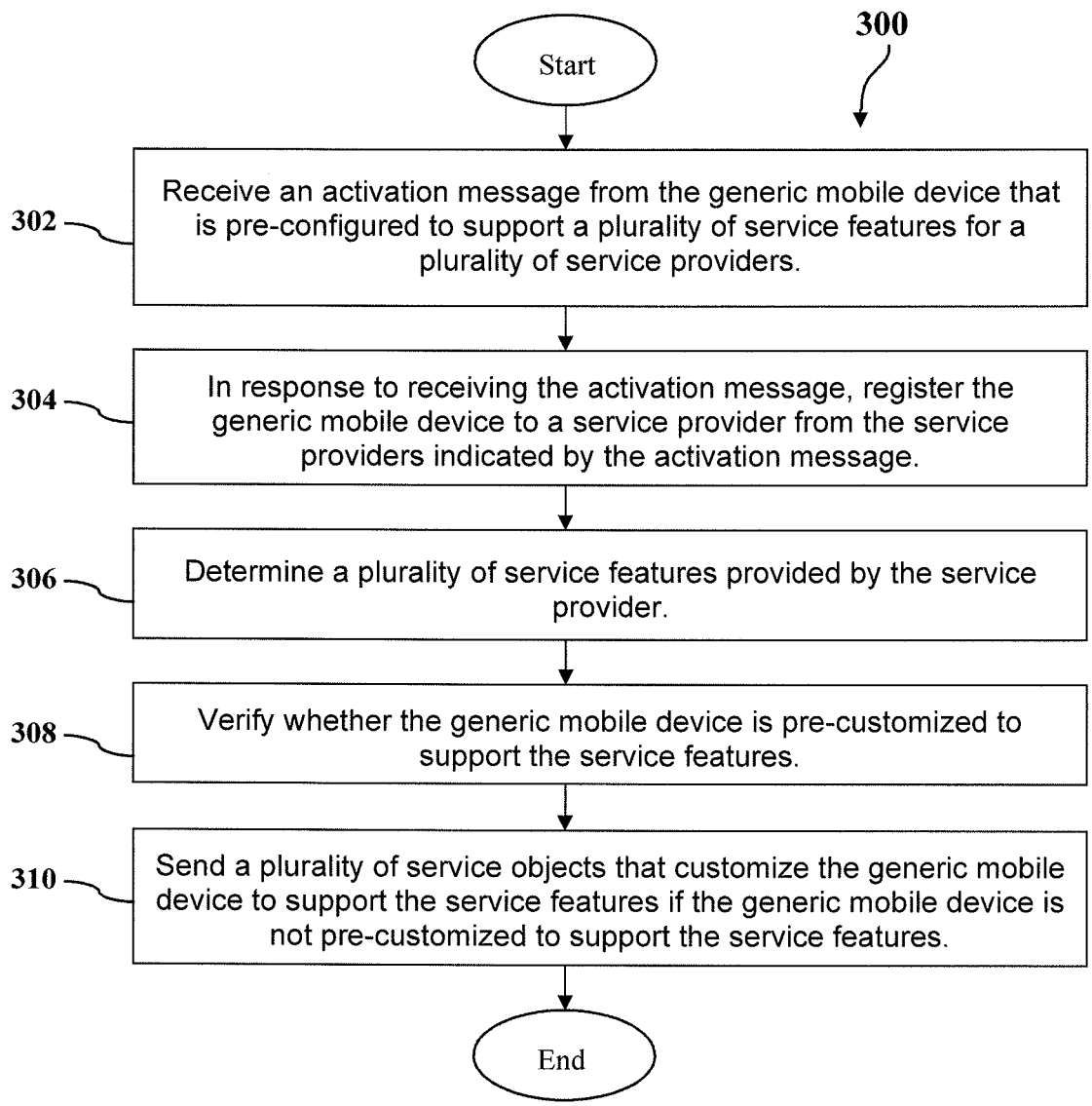
FIG. 4 is a flow chart of a method for over-the-air mobile device customization according to an embodiment of the disclosure.

FIG. 4 illustrates an embodiment of a method 300 for over-the-air mobile device customization on the server side of a communication system. For instance, the over-the-air customization method 300 may be implemented using the application 46 that runs on the processor 42 of the service awareness provisioning server 40. At block 302, an application running on the server side may receive an activation message from the generic mobile device that is pre-configured to support a plurality of service features for a plurality of service providers. For example, the application 46 may receive and process the activation message form the mobile phone 12. Block 304 may be similar to block 202 above. At block 304, in response to receiving the activation message, the application may register the generic mobile device to a service provider from the service providers indicated by the activation message. For example, the application 46 may determine the service provider associated with mobile phone 12 using identifying information in the activation message, as described above. At block 306, the application may determine a plurality of service features provided by the service provider. The service features may be related to voice calling, data calling, data or Internet communications, text messaging, call roaming, wireless link connectivity, etc. At block 308, the application may verify whether the generic mobile device is pre-configured to support the service features. The application 46 may obtain this information from a data store or from the service provider based on mobile device 12 identifying information in the activation message. At block 310, the application may send a plurality of service objects that customize the generic mobile device to support the service features if the generic mobile device is not pre-configured to support the service features. For instance, the application 46 may send configuration parameters that may reconfigure or change at least some of the pre-configured functions/applications on the mobile device 12 to support or adjust to the service features by the provider.

Figure 5:
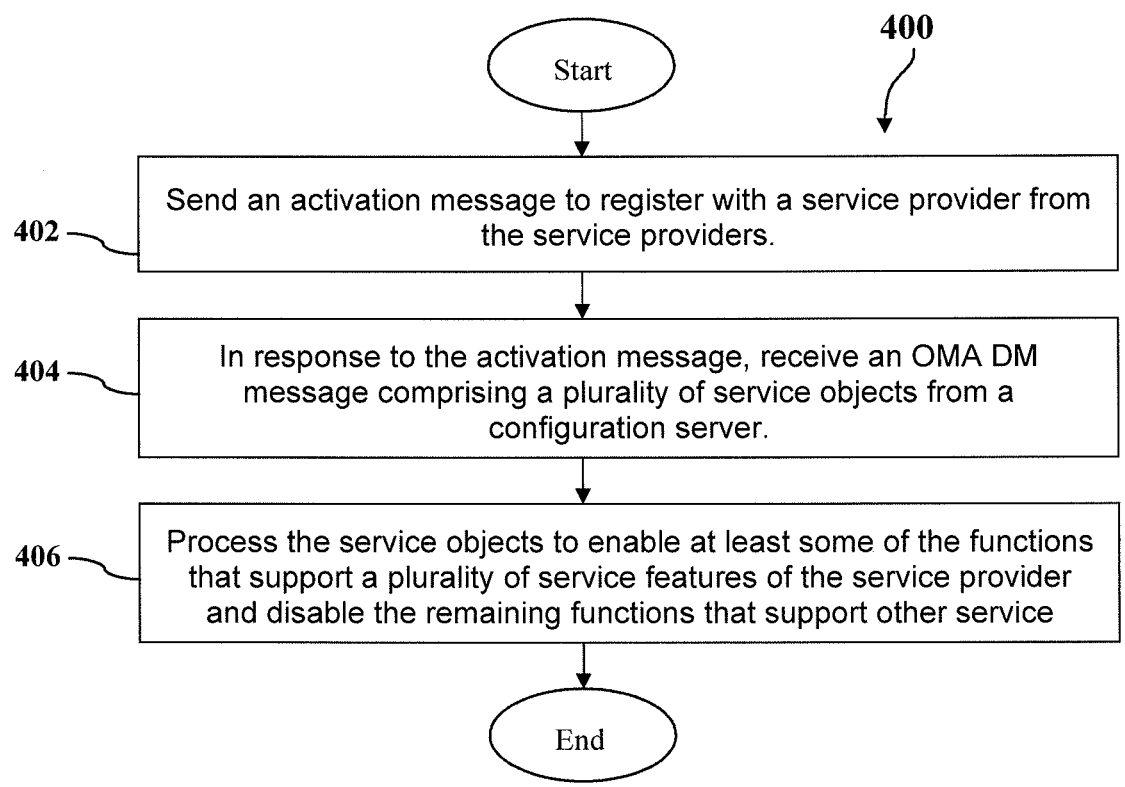
FIG. 5 is a flow chart of a method for over-the-air mobile device customization according to an embodiment of the disclosure.

FIG. 5 illustrates an embodiment of a method 400 for over-the-air mobile device customization on the mobile device side of a communication system. For instance, the over-the-air customization method 400 may be implemented by a customization application 29 of the mobile phone 12 to customize the mobile phone 12 upon activation and registration with a service provider via the service awareness provisioning server 40. At block 402, an activation message may be sent to register with a service provider from the service providers. The mobile phone 12 may send the activation message to the service awareness provisioning server 40 including identifying information for the mobile phone 12 and the service provider which the mobile phone 12 is registering to. At block 404, in response to the activation message, an OMA DM message comprising a plurality of service objects may be received from a configuration server. The mobile phone 12 may receive the OMA DM message including the OMA service objects from the server 40. The received message may then be processed by the customization application 29 of the mobile phone 12. At block 406, the service objects may be processed to enable at least some of the functions that support a plurality of service features of the service provider and disable the remaining functions that support other service. For example, a plurality of flags may be set or unset to enable and disable the applications and functions. Additionally, some of the embedded functions/applications may be reconfigured using configuration parameters included in the service objects.

Figure 6:
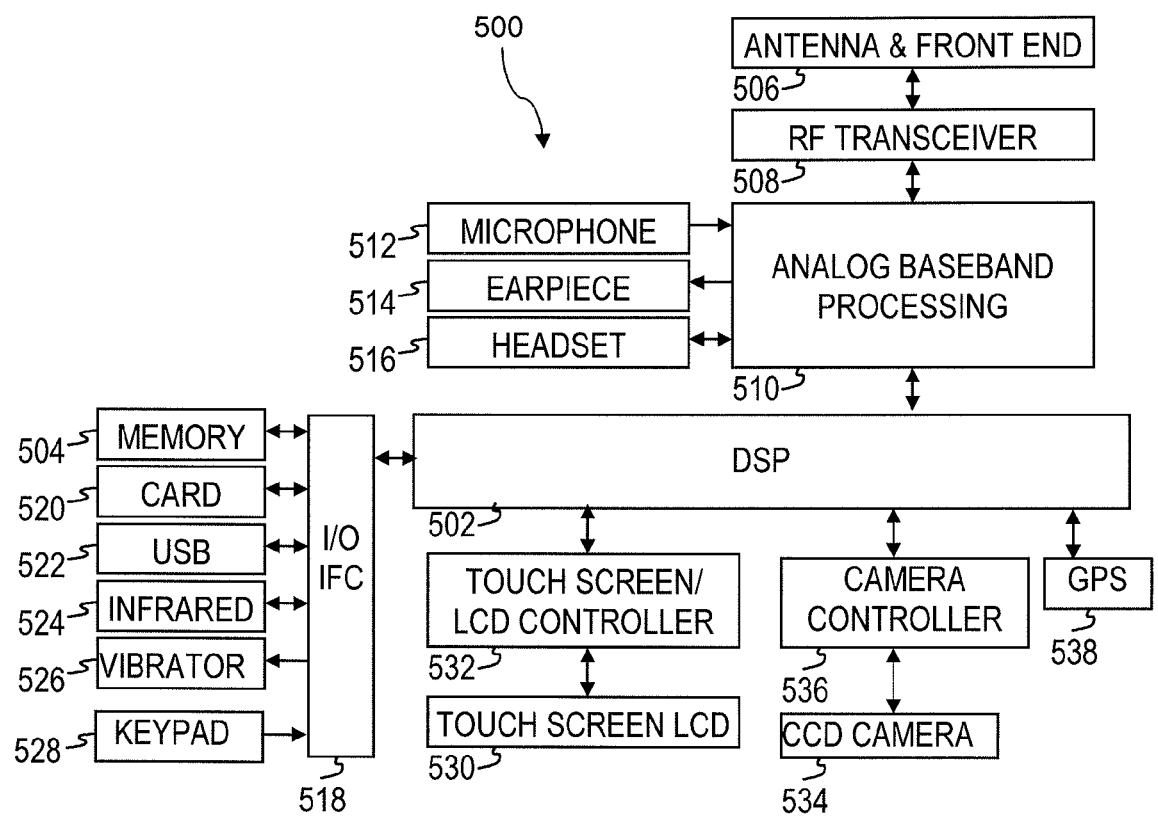
FIG. 6 is an illustration of a mobile device according to an embodiment of the disclosure.

FIG. 6 shows a block diagram of a mobile device 500. While a variety of known components of handsets 500 are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 500 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 500 to send and receive information from a radio access network (RAN) or some other available wireless communications network or from a peer mobile device 500. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 500 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth® interface or an IEEE 802.11 compliant wireless interface may enable the mobile device 500 to communicate wirelessly with other nearby handsets and/or wireless base stations.

The input/output interface 518 may further connect the DSP 502 to the vibrator 526 that, when triggered, causes the mobile device 500 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530.

The CCD camera 534 enables the mobile device 500 to take digital pictures. The DSP 502 communicates with the CCD camera 534 via the camera controller 536. The GPS sensor 538 is coupled to the DSP 502 to decode global positioning system signals, thereby enabling the mobile device 500 to determine its position. In another embodiment, a camera operating according to a technology other than charge coupled device cameras may be employed. Various other peripherals also may be included to provide additional functions, e.g., radio and television reception.

Figure 7A:
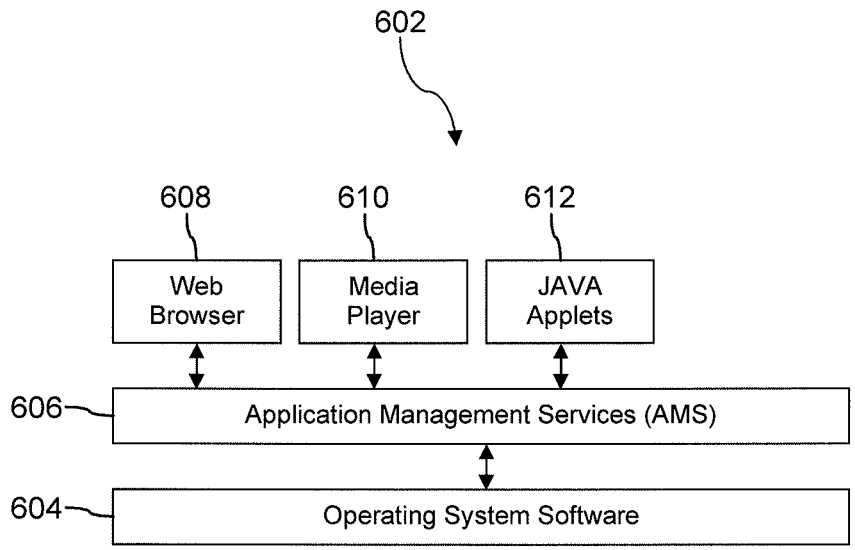
FIG. 7A is a block diagram of a software architecture for a mobile device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 7A are a web browser application 608, a media player application 610, JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 7B:
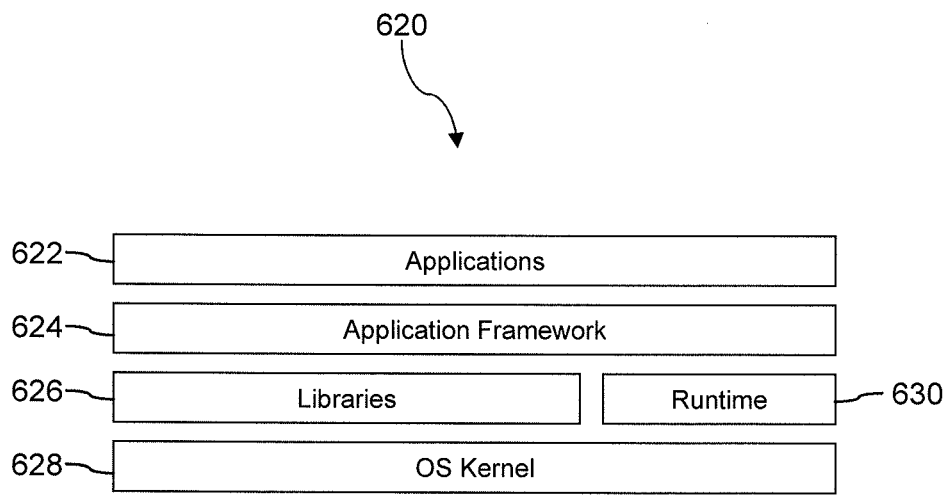
FIG. 7B is a block diagram of another software architecture for a mobile device according to an embodiment of the disclosure.

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
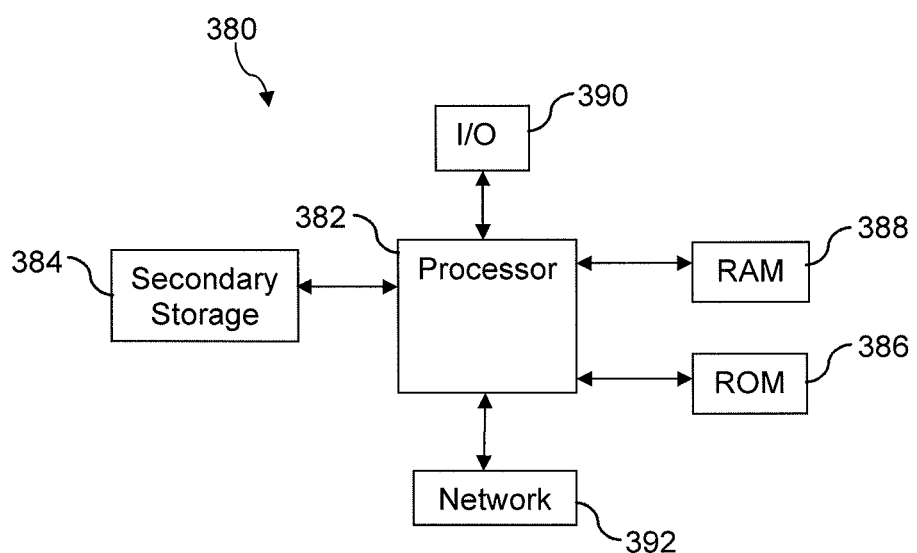
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for open mobile alliance (OMA) device management (DM) and over-the-air customization of a generic mobile device, comprising:

receiving, by a server from the generic mobile device, an activation message to register with a service provider, wherein the generic mobile device comprises generic firmware that is pre-configured to support a plurality of functions;

associating, by the server, the generic mobile device with the service provider from among a plurality of service providers based on the activation message; and based on the service provider, sending, from the server to the generic mobile device using an OMA DM protocol via a wireless network, one or more OMA service objects to a memory location on the generic mobile device that is outside of a memory portion storing the generic firmware, wherein the one or more OMA service objects enable or disable each of the pre-configured functions of the generic firmware and pre-configured applications on the generic mobile device to support one or more service features available by the service provider without reflashing the generic firmware, updating the generic firmware, and changing the amount of information already within the generic firmware on the generic mobile device, and wherein the OMA service objects comprise a plurality of flags and a plurality of configuration parameters that are processed on the generic mobile device to switch on or off one or more of the pre-configured applications and to reconfigure one or more of the pre-configured applications on the generic mobile device to support one or more service features available by the service provider.

2. The method of claim 1, wherein the OMA service objects comprise a plurality of flags that are processed on the generic mobile device at the memory location to switch on or off one or more of the pre-configured functions.

3. The method of claim 1, wherein the one or more OMA service objects reconfigure one or more of the pre-configured functions on the generic mobile device to support one or more service features available by the service provider, and wherein the OMA service objects comprise a plurality of configuration parameters that are processed on the generic mobile device to reconfigure one or more of the pre-configured functions.

4. The method of claim 1, wherein the service features and the pre-configured functions are related to voice calling, data calling, data communications, radio connectivity, call roaming, text messaging, web browsing, or combinations thereof.

5. The method of claim 1, wherein the pre-configured functions comprise input and output interface functions of the generic mobile device.

6. The method of claim 1, further comprising: registering, by an application executing on the server based on the association, the generic mobile device to the service provider that is associated with the wireless network.

7. The method of claim 6, wherein the application registers the generic mobile device to the service provider using any of a stock keeping unit number, an electronic serial number, or a mobile subscriber number indicated by the activation message.

8. The method of claim 1, wherein the memory portion storing the generic firmware is read-only memory (ROM).

9. The method of claim 8, wherein the OMA DM service objects are received outside of ROM at the memory location on the generic mobile communication device.

10. The method of claim 1, wherein the generic firmware comprises a plurality of function parameters and a plurality of embedded applications that are certified for use prior to a registration with the service provider.

11. The method of claim 1, wherein the generic firmware identifies at least one OMA DM service object as corresponding to at least one function parameter in the generic firmware.

12. The method of claim 11, wherein the at least one function parameter supports at least some of the one or more service features available by the service provider.

13. The method of claim 1, wherein the OMA DM service objects are prevented from being written into the memory portion storing the generic firmware.

14. The method of claim 1, wherein in response to sending the plurality of OMA DM service objects, an embedded application in the generic firmware is configured without updating or changing the storage of data already within the generic firmware on the generic mobile device.

15. The method of claim 1, wherein the OMA DM service objects are sent to the generic mobile device without updating or changing the storage of data already within the generic firmware at the memory portion on the generic mobile device.

16. The method of claim 1, wherein the generic mobile device comprises a customization application that is embedded in the generic firmware, and wherein the OMA DM service objects are processed by the customization application in response to being sent via the OMA DM protocol.

* * * * *